Dec. 26, 1961 L. H. LEONARD, JR 3,014,349
METHOD OF OPERATION OF AN ABSORPTION REFRIGERATION SYSTEM
Filed Jan. 13, 1960
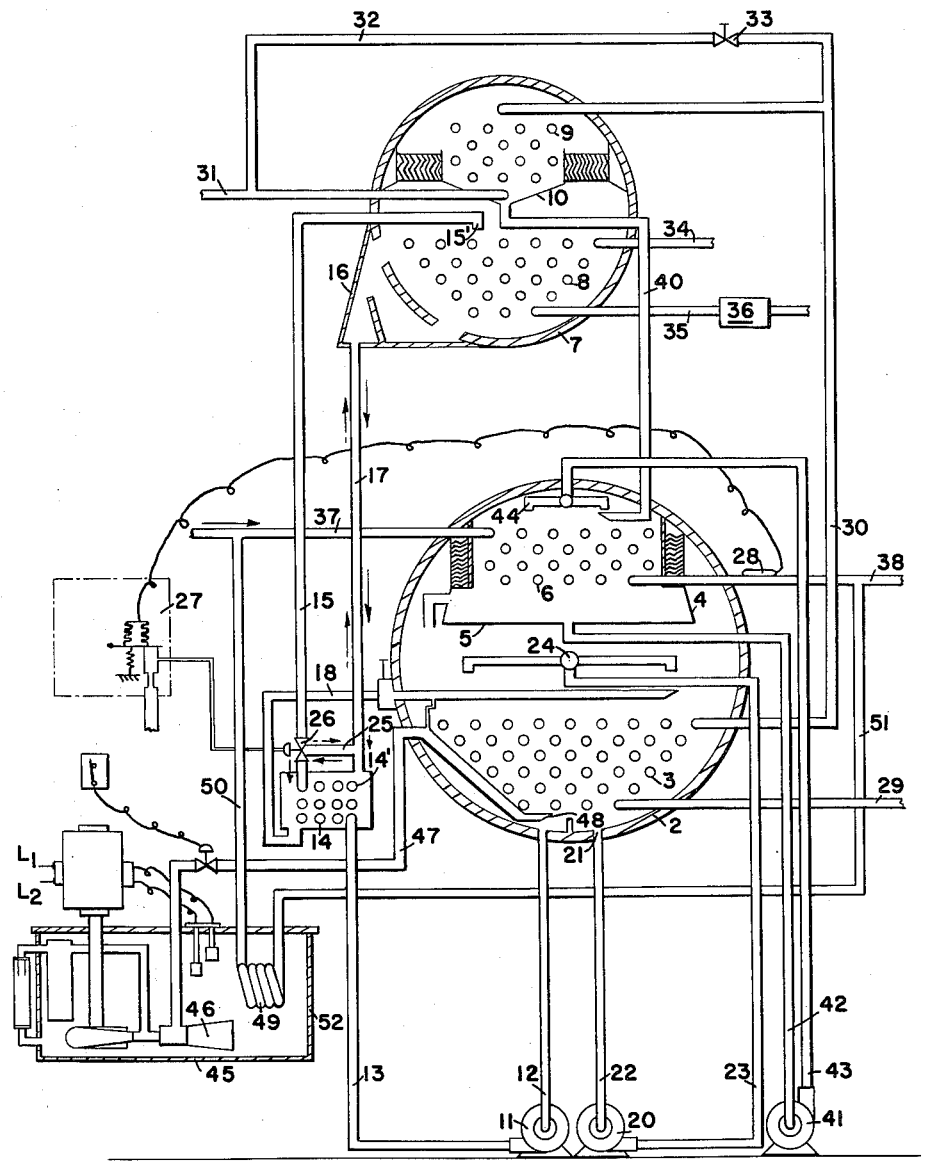
INVENTOR.
LOUIS H. LEONARD JR.
BY *Herman Seid*
ATTORNEY.

3,014,349
METHOD OF OPERATION OF AN ABSORPTION REFRIGERATION SYSTEM
Louis H. Leonard, Jr., Dewitt, N.Y., assignor to Carrier Corporation, Syracuse, N.Y., a corporation of Delaware
Filed Jan. 13, 1960, Ser. No. 2,210
6 Claims. (Cl. 62—85)

This invention relates to a method of operation of an absorption refrigeration system and, more particularly, to a method of liquefying solidified solution in the solution heat exchanger of an absorption refrigeration system employing a saline solution as an absorbent and a medium miscible therewith as a refrigerant.

Absorption refrigeration systems of the type employed in commercial air conditioning, for example, as disclosed and claimed in the copending application of Louis H. Leonard, Jr., filed January 13, 1960, Serial No. 2,203, entitled Absorption Refrigeration Systems and Method of Operating the Same, are highly satisfactory in use. Infrequently, however, due to excessive air leakage into the system, solidification of the strong solution in the solution heat exchanger of the system may occur.

This disadvantage may occur because the system is not sufficiently airtight permitting air to enter the machine. During operation, the air is collected in the absorber. If leakage into the system is excessive, the purge arrangement may not be adequate to remove the non-condensible gases. Thus, in effect, a layer of non-condensible gases may collect over the surface of solution in the absorber preventing the solution from absorbing satisfactorily refrigerant vapor passing to the absorber from the evaporator. As a result, solution passing to the generator from the absorber may be of a concentration considerably greater than desired. In the generator, vapor is boiled off so that the concentration of the solution leaving the generator is too high. In the solution heat exchanger, when such solution is cooled, precipitation of the salt or solidification of the solution occurs resulting in blocking or preventing flow of strong solution to the absorber with the result that the system can no longer provide refrigeration. That is, if the strong solution side of the heat exchanger is solidified, solution can no longer return to the absorber. At the same time, solution is continuously pumped to the generator and remains in the generator. In a short time, the absorber and generator pumps run out of solution and the refrigeration process stops. While the occurrence is rare during operation, it may occur infrequently so that it is desirable to provide some ready operation of the system to liquefy solution solidified in the heat exchanger and in the strong solution line leading thereto.

The term "solidified solution" is used herein to designate a soft, slush-like material or solid material in the nature of a hydrate composed largely of the absorbent salt and containing a minor amount of refrigerant or composed almost completely of hydrates of the absorbent salt.

The chief object of the present invention is to provide a method of operation of an absorption refrigeration system which permits ready liquefication of solution solidified in the solution heat exchanger of the system.

An object of the invention is to provide a method of liquefying solidified solution in the solution heat exchanger of an absorption refrigeration system. Other objects of the invention will be readily perceived by reference to the following description.

The term "weak solution" is used herein to describe a solution weak in absorbing power. The term "strong solution" is used herein to define a solution strong in absorbing power.

The preferred absorbing solution is a solution of lithium bromide in water. The preferred refrigerant is water. Concentration of solution leaving the generator may vary but preferably is about 66% during full load operation of the system.

This invention relates to a method of liquefying solution solidified on the strong solution side of the heat exchanger of an absorption refrigeration system in which separate paths are provided for the flow of weak and strong solutions between the generator and the heat exchanger, the steps consisting in connecting the weak solution path with the strong solution path, forcing weak solution through a third path including at least a portion of the weak solution path and at least a portion of the strong solution path, heating the weak solution in the generator, and returning at least a portion of the heated weak solution through the third path to liquefy solidified strong solution in the heat exchanger.

The attached drawing is a diagrammatic view of an absorption refrigeration system serving to illustrate the method of operation of the present invention.

Referring to the attached drawing, there is illustrated diagrammatically an absorption refrigeration system embodying the method of operation disclosed by the present invention. The system comprises a shell 2 containing a plurality of tubes 3 which cooperate with the shell to form an absorber. Placed in shell 2 above the absorber is a pan-like member 4 which cooperates with shell 2 to form an evaporator. The evaporator includes a plurality of tubes 6 extending longitudinally of the shell above pan 4; medium to be cooled passes through these tubes in heat exchange relation with liquid refrigerant sprayed thereover.

A second shell 7, preferably, is placed above the first shell. Tubes 8 extend in the lower portion of shell 7 and cooperate with shell 7 to form a generator. A plurality of tubes 9 are placed in the upper portion of shell 7 to form a condenser. The tubes 9 cooperate with a pan-like member 10 to form the condenser.

Pump 11 withdraws weak solution from absorber 3 through line 12. Pump 11 forwards weak solution through line 13 to heat exchanger 14 in which the weak solution is placed in heat exchange relation with strong solution returning from the generator, as hereinafter described. The weak solution passes through tubes 14' of heat exchanger 14 while the strong solution is exteriorly of tubes 14' in the heat exchanger. The weak solution is then forwarded from the tubes 14' of heat exchanger 14 through line 15 to generator 8 being discharged therein through suitable spray arrangements 15'. Arrangements 15' may include two inlet pipes located at each end of the generator with the pipe placed nearest to the overflow arrangement 16 being placed slightly lower than the other for more satisfactory partial load operation. Strong solution flows from generator 8 through the overflow arrangement 16, line 17, heat exchanger 14 exteriorly of tubes 14' and line 18 to the absorber, preferably, being discharged therein adjacent one end of shell 2; that is, strong solution flows through forces of gravity from the generator to the absorber. It will be understood, of course, if desired, the strong solution may be discharged in the absorber over the tubes therein.

Pump 20 serves as an absorber pump and is employed to withdraw solution of intermediate concentration from absorber 3 through outlet 21 and line 22. Pump 20 forwards the solution of intermediate concentration through line 23 to the spray arrangement 24 of the absorber. Spray arrangement 24 serves to distribute the recirculated solution over the tubes throughout the length of absorber 3. It will be understood the strong solution mixes to some extent with solution in the absorber and that complete mixing occurs as the pump 20 forwards the mixed solution so that a solution having a concentration intermediate the concentration of the strong and weak solutions is circulated. Reference is made to United States Patent No. 2,840,997, granted July 1, 1958, for a more detailed description of the flow of solution in the system.

A bypass line 25 is placed adjacent heat exchanger 14 and serves to connect line 15 with line 17 on the generator side of the heat exchanger. A three-way modulating valve 26 is placed, preferably, at the juncture of line 25 with line 15, for a purpose hereinafter explained. It is desirable to place valve 26 as close as possible to the heat exchanger 14 to assure that a head exists in the weak solution line. Thus if the valve is modulated to assure that all weak solution flow is through the bypass line 15, and the valve leaks to the weak solution line to the generator, the head in such line will prevent weak solution leading to the generator. Valve 26 is a pneumatically operable valve actuated by a control 27 responsive to temperature indicated by a bulb 28. The function and operation of this control arrangement will be described in more detail hereinafter.

Condensing water is forwarded by a pump (not shown) through line 29 to the tubes 3 of the absorber. The condensing water passes from the tubes 3 of the absorber through line 30 to the tubes 9 of the condenser. Condensing water leaves the tubes 9 of the condenser through line 31. A bypass line 32 is provided about the tubes 9 of the condenser extending from line 30 to line 31. A manual valve 33 is placed in bypass line 32. This bypass permits flow of condensing water through the tubes of the condenser to be adjusted at full load when a system is installed. Thereafter, no adjustment of the flow of condensing water through the tubes of the condenser is required.

Steam is supplied to the tubes 8 of the generator through line 34. If desired, a suitable pressure regulating valve (not shown) may be placed in line 34 to assure desired steam pressure in the generator. Ordinarily, however, the system employs steam at 12 pounds pressure and steam at such pressure is ordinarily supplied from the usual boilers employed in the industry. Steam condensate leaves the tubes of generator 8 through line 35, a suitable steam-trap 36 being provided in line 35 to assure that only condensate leaves the generator.

Medium to be cooled is forwarded by a pump (not shown) through a line 37 to the tubes 6 of the evaporator. The cooled medium leaves the tubes 6 through line 38 and is forwarded to a place of use such as the central station of an air conditioning system. The medium after passing through the central station, returns to the evaporator through line 37 to be again cooled and reused. Preferably, bulb 28 of control arrangement 27 is placed on line 38 to reflect the temperature of cooled medium leaving the evaporator which, in effect, indicates the load imposed upon the system.

Condensate leaves pan 10 of the condenser through line 40 and is returned to the evaporator and discharged therein over the tubes 6 to wet the tubes. It will be appreciated the refrigerant is flashed or vaporized by the heat exchange relation with medium passing through the tubes. Flashed vapor passes to the absorber to be absorbed by solution therein.

Pump 41 serves to recirculate liquid refrigerant collected in the evaporator about the evaporator. Pump 41 is connected to the evaporator by line 42 to withdraw liquid refrigerant therefrom. Pump 41 forwards the liquid refrigerant through line 43 to spray arrangement 44 of the evaporator, the liquid refrigerant flash-cooling upon discharge of the evaporator, remaining liquid refrigerant wetting the tubes to cool medium passing through the tubes. The heat exchange relation between medium passing through the tubes and the liquid refrigerant on the exterior of the tubes evaporates liquid refrigerant, the vapor passing to the absorber as previously described.

A suitable purge arrangement 45 is provided to remove non-condensible gases from the absorber. The ejector 46 of purge arrangement 45 is connected by line 47 to a purge line 48 extending longitudinally of the absorber. The cooling coil 49 of purge arrangement 45 is connected to line 37 by line 50 and to line 38 by line 51, permitting medium to be employed for cooling solution in the purge tank 52. Purge arrangement 45 is disclosed and claimed in application, Serial No. 565,324, filed February 14, 1956, and reference is made to such application for a more complete description of the purging arrangement.

Considering the control arrangement of the absorption refrigeration system, as previously described, bypass line 25 connects weak solution line 15 and strong solution line 17 adjacent the heat exchanger 14, modulating three-way valve 26 being placed at the juncture of bypass line 25 and weak solution line 15 to proportion the quantities of weak solution flowing through such lines. At shutdown, it will be understood valve 26 is normally closed so far as line 15 is concerned, permitting line 25 to be open. It will be understood that weak solution flow to the heat exchanger is constant under all load conditions. Valve 26 is connected to a pneumatic control 27 which in turn is actuated by means of a bulb 28 placed adjacent line 38 in a position to sense the temperature of cooled medium leaving the evaporator. It will be appreciated bulb 28 may be placed in contact with line 38 or may be placed in line 38, as desired. Valve 26 is so designed as to prevent air leakage into the machine. While I have described the control arrangement as being a pneumatic control, it will be understood that any electrically or electronically operated controls may be provided.

Under full load condition, all weak solution passes through line 15 to the generator and is discharged therein. However, as the load imposed on the system decreases as reflected by the temperature of chilled water leaving the evaporator, valve 26 is actuated to divert a portion of the flow through the weak solution line through bypass line 25 to the strong solution line 17. So diverting weak solution varies the concentration of solution supplied to the absorber in accordance with cooled medium requirements. Generally speaking, only enough solution is sent to the generator for reconcentration as is required to keep the absorber solution at the desired concentration to meet load requirements.

Considering the operation of the absorption refrigeration system, it will be appreciated that the machine is designed to operate at a desired steam pressure, for example, 12 pounds, because most existing steam boilers are designed to provide steam at such pressure. It will be appreciated other pressures may, of course, be used and in such case a pressure regulating valve may be placed in the steam line to assure that steam at the desired pressure is provided to the generator. I have described too a bypass about the tubes of the condenser for condensing water. It will be appreciated that in many cases such bypass is not necessary, but that it is desirable in order to adjust the machine to operation at full load conditions. After the machine is adjusted to operation at full load conditions, the condenser bypass need not be actuated for further operation. If desired, of course, for this purpose steam pressure may be varied.

At start-up of the system, the generator contains a large amount of precipitated or crystallized lithium bromide salt. In some cases, it appears as if the generator tubes were covered with a pile of white snow. It will be appreciated there is no need for manual or automatic steam valves to be closed during the shutdown period since the low thermal conductivity of the solid salt serves as an excellent insulator to shield the generator from the hot steam in the tube. Under such conditions, the salt will dissolve at least partially during shutdown if the valve is closed which is desirable. The solution in the remainder of the system including the heat exchanger is under extremely dilute conditions. When the machine is started, medium to be cooled is forwarded through line 37 to the tubes 6 of evaporator 4 and leaves the tubes 6 of evaporator 4 through line 38. At start-up, the pumps are actuated, pump 11 withdrawing weak solution from the absorber through line 12 and forwarding the weak solution through line 13, tubes 14' of heat exchanger 14 and line 15 to generator 8. It will be appreciated valve 26 gradually opens to permit full solution flow to the generator. In the generator, the solution flows over the top of the salt pile gradually dissolving the solid salt and returning the concentrated solution to the absorber where it can immediately go to work to produce useful refrigeration. It will be appreciated that instead of needing to wait for the overall solution concentration in the machine to build up, the latent capacity of the stored solid salt in the generator is instantly ready to go to work.

Refrigerant vapor is boiled from the solution in the generator 8, vapor passing to condenser 9 and being condensed therein, the condensate returning to the evaporator through line 40.

Strong solution leaves the generator through overflow arrangement 16, line 17, heat exchanger 14 exteriorly of tubes 14', line 18 and is discharged preferably over an end of the absorber tube bundle. Strong solution is flash-cooled to some slight extent as it is discharged in the absorber. The discharged strong solution mixes with solution in the absorber and is withdrawn from the absorber through outlet 21 and line 22 by pump 20, solution of intermediate concentration so formed being returned to the absorber through line 23 and being sprayed over the tube bundle by spray arrangement 24.

Pump 41 serves to withdrawn liquid refrigerant from the pan 5 of evaporator 4, and to recirculate the liquid refrigerant through lines 42 and 43 to the discharge means 44 of the evaporator. The discharge means 44 sprays the liquid refrigerant over the tubes 6 of evaporator 4. The tubes are wetted by the liquid refrigerant, the wetted refrigerant being vaporized by the heat exchange relation with medium passing through the tubes. Vapor so formed passes outwardly through the eliminators and flows downward to the absorber being absorbed by solution therein.

Vapor condensate is returned from condenser 9 through line 40 to the evaporator being flash-cooled upon discharge therein over tubes 6. Thus, the vapor condensate aids in wetting the tubes to cool the medium passing therethrough.

Now, considering operation at full load conditions, the cooled medium rapidly cools down to design conditions and valve 26 remains open to permit the full volume of weak solution to be supplied to the generator to dissolve the solid salt. Assuming the system goes on operation at partial load as indicated by a decrease in the temperature of cooled medium leaving the evaporator reflected by bulb 28, control 27 actuates valve 26 to throttle flow of weak solution to the generator and to bypass some portion of the weak solution to the strong solution line 17 where it mixes with the strong solution prior to the entrance of the solution into the heat exchanger 14. As the weak solution flow to the generator is reduced, and more solution is bypassed or diverted, the solution concentration in the generator gradually increases, at approximately 50% load approaching the consistency of thick syrup. At approximately 25% load, it appears to be a thick slush. Even though the solution in the generator begins to increase in concentration as soon as the system begins to operate on partial load, the solution leaving the generator is diluted to more than a safe concentration before it reaches the heat exchanger by the addition of weak solution thereto thus preventing precipitation or crystallization in the heat exchanger. In one sense, the present arrangement may be considered as the circulation of solution at zero load with the addition of solid salt or slush thereto as required to provide a solution of higher concentration as the load imposed upon the system increases, that is, to maintain a desired concentration in accordance with the load imposed on the system.

It has been found, however, that if the system is not airtight and excessive leakage into the system occurs as may happen infrequently, solidification of strong solution in the heat exchanger 14 exteriorly of tubes 14' may occur. Solidification of strong solution in the heat exchanger prevents the passage of strong solution to the absorber with the result that eventually the system is unable to provide refrigeration. The present invention is designed to provide a method of operation which readily and quickly permits liquefication of solidified soluiton in the heat exchanger and in the strong solution line connecting the heat exchanger with the generator without the use of additional apparatus.

If it be assumed that strong solution has solidified in heat exchanger 14 exteriorly of tubes 14', then flow of strong solution to the absorber is partially or wholly blocked resulting in reduction or destruction of the refrigeration capacity of the system. Under these conditions, flow of condensing water through tubes 9 of the condenser is discontinued and valve 26 actuated to direct weak solution from tubes 14' of heat exchanger 14 through bypass line 25 to line 17 as indicated by the dot-and-dash arrow. The weak solution does not flow substantially through line 17 to the heat exchanger 14 exteriorly of tubes 14' since its passage therethrough is blocked so that substantially all the flow occurs in the opposite direction as indicated by the dot-and-dash arrow, through line 17 to the generator 8. Since steam is present in the generator 8 and the flow of condensing water through condenser 9 has been discontinued, it will be appreciated that solution in the generator is quickly heated to a high temperature but not reconcentrated. Thereupon, operation of pump 11 is discontinued, permitting the highly heated solution to flow by gravity from the generator. The heated solution flows through line 17, as indicated by the solid arorw, some portion thereof gradually liquefying solidified solution in line 17, opening the entrance to the heat exchanger and beginning to liquefy solution in the heat exchanger; the major portion of the highly heated solution flows in the reverse direction, as indicated by the solid arrow, through bypass line 26 and a portion of the weak solution line 15 to the interior of tubes 14' thereby heating the solidified solution exteriorly of tubes 14', liquefying solidified weak solution and absorbing precipitated salt thus opening a passage through the heat exchanger for flow of strong solution to the absorber. It will be apreciated that as the passage through the heat exchanger opens, all solidified solution is quickly liquefied and the refrigeration capacity of the system rapidly restored. It will be appreciated the procedure may be repeated as required to liquefy and absorb solidified solution in the heat exchanger.

The present invention provides a method of operation of an absorption refrigeration system which permits ready and rapid liquefication of solidified strong solution in the solution heat exchanger of the system without requiring additional expensive equipment for the purpose. The method of liquefying solidified solution in the solution heat exchanger is inexpensive, readily conducted by the operator of the machine and quickly performed if necessary to restore refrigeration capacity to the system.

While I have described a preferred embodiment of the invention it will be understood the invention is not limited thereto since it may be otherwise embodied within the scope of the following claims.

I claim:

1. In the method of liquefying solidified solution in the solution heat exchanger of an absorption refrigeration system in which separate paths are provided for the flow of weak and strong solutions between the generator and the heat exchanger, the steps which consist in connecting the weak solution path with the strong solution path, forcing weak solution through a third path between the heat exchanger and the generator including at least a portion of the weak solution path and at least a portion of the strong solution path, heating the weak solution in the generator, and returning the weak solution through the third path to the heat exchanger to liquefy solidified strong solution in the heat exchanger.

2. In the method of liquefying solidified solution in the solution heat exchanger of an absorption refrigeration system in which separate paths are provided for the flow of weak and strong solutions between the generator and the heat exchanger, the steps which consist in connecting the weak solution path with the strong solution path, forcing weak solution through a third path between the heat exchanger and the generator including at least a portion of the weak solution path and at least a portion of the strong solution path, heating the weak solution in the generator, returning the weak solution through the third path to the heat exchanger to liquefy solidified strong solution in the heat exchanger, and repeating the process as required to open a passage through the heat exchanger for strong solution to return to the absorber.

3. In the method of liquefying solidified solution in the solution heat exchanger of an absorption refrigeration system in which weak solution passes through tubes in the heat exchanger and strong solution passes exteriorly of the tubes in heat exchange relation with the weak solution, the steps which consist in directing weak solution from the tubes of the heat exchanger through a portion of the weak solution line and at least a portion of the strong solution line to the generator, heating the weak solution in the generator, and directing at least a portion of the heated weak solution through a portion of the strong solution line and a portion of the weak solution line to the interior of the heat exchanger tubes thereby heating solidified solution in the heat exchanger to liquefy the same and to reabsorb precipitated salt therein thus opening a passage for strong solution through the heat exchanger to permit continued operation of the machine.

4. In the method of operation of an absorption refrigeration system containing a saline solution as an absorbent and a material miscible therewith as an absorbent and including a shell and tube solution heat exchanger placed in the system connected to the generator by a strong solution line and a weak solution line, the lines being connected by a bypass through which under partial load operation weak solution may be forwarded to the strong solution line to mix with strong solution prior to its entrance into the heat exchanger, the steps which consist in passing weak solution through the bypass line to the strong solution line and through the strong solution line to the generator, heating the solution in the generator, and returning at least a portion of the heated solution from the generator through the strong solution line, the bypass line and the weak solution line to the interior of the tubes of the heat exchanger thereby heating solidified solution in the exchanger exteriorly of the tubes to liquefy the same and to absorb precipitated salt in the heat exchanger thus opening a passage through the heat exchanger for flow of strong solution to the absorber of the system.

5. A method of operation of an absorption refrigeration system according to claim 4 in which the process is repeated as required to open a passage through the heat exchanger for flow of strong solution to the absorber of the system.

6. A method of operation of an absorption refrigeration system according to claim 5 in which passage of condensing water through the condenser in heat exchange relation with refrigerant vapor therein is discontinued to permit solution to be heated in the generator.

References Cited in the file of this patent
UNITED STATES PATENTS

| | | |
|---|---|---|
| 2,582,837 | Leonard | Jan. 15, 1952 |
| 2,679,733 | Ashley | June 1, 1954 |